United States Patent
Naijo et al.

(10) Patent No.: US 8,736,941 B2
(45) Date of Patent: May 27, 2014

(54) ELECTROCHROMIC DISPLAY APPARATUS AND METHOD OF MANUFACTURING THE SAME

(75) Inventors: Yoshihisa Naijo, Kanagawa (JP); Tohru Yashiro, Kanagawa (JP); Shigenobu Hirano, Kanagawa (JP); Masahiro Yanagisawa, Kanagawa (JP); Masahiro Masuzawa, Kanagawa (JP); Akishige Murakami, Kanagawa (JP); Hiroyuki Takahashi, Kanagawa (JP); Koh Fujimura, Tokyo (JP); Yoshinori Okada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 481 days.

(21) Appl. No.: 13/045,746

(22) Filed: Mar. 11, 2011

(65) Prior Publication Data
US 2011/0222139 A1  Sep. 15, 2011

(30) Foreign Application Priority Data

Mar. 12, 2010 (JP) ................. 2010-056696
Nov. 29, 2010 (JP) ................. 2010-265426

(51) Int. Cl.
*G02F 1/153* (2006.01)

(52) U.S. Cl.
USPC ............ 359/270; 359/265; 359/268; 359/273

(58) Field of Classification Search
USPC ................................. 359/265–275
See application file for complete search history.

(56) References Cited

U.S. PATENT DOCUMENTS

| | | | |
|---|---|---|---|
| 3,840,288 A * | 10/1974 | Schnatterly | 359/274 |
| 6,301,038 B1 | 10/2001 | Fitzmaurice et al. | |
| 7,333,259 B2 | 2/2008 | Hirano et al. | |
| 7,489,432 B2 | 2/2009 | Shibuya et al. | |
| 7,525,716 B2 | 4/2009 | Hirano et al. | |
| 7,894,118 B2 | 2/2011 | Hirano et al. | |
| 2006/0066933 A1 * | 3/2006 | Jagt et al. | 359/265 |
| 2008/0278797 A1 | 11/2008 | Matsubara et al. | |
| 2009/0161195 A1 | 6/2009 | Jang et al. | |
| 2009/0185256 A1 * | 7/2009 | Nakaho et al. | 359/270 |
| 2009/0231664 A1 | 9/2009 | Shibuya et al. | |
| 2010/0309538 A1 | 12/2010 | Tatsuura et al. | |

FOREIGN PATENT DOCUMENTS

| | | |
|---|---|---|
| EP | 2083318 A1 | 7/2009 |
| JP | 2003-121883 | 4/2003 |
| JP | 2003-270671 | 9/2003 |
| JP | 2004-151265 | 5/2004 |
| JP | 2006-106669 | 4/2006 |
| JP | 3955641 | 5/2007 |

(Continued)

OTHER PUBLICATIONS

Jul. 25, 2011 European search report in connection with counterpart European patent application No. 11 15 7826.

(Continued)

*Primary Examiner* — Evelyn A. Lester
(74) *Attorney, Agent, or Firm* — Cooper & Dunham LLP

(57) ABSTRACT

An electrochromic display apparatus is disclosed that includes a stacked body which includes a display electrode and an electrochromic layer that are stacked on each other; a film which includes through holes, and is disposed on one of the display electrode and the electrochromic layer of the stacked body; and an opposed substrate on which an opposed electrode that faces toward the display electrode is formed.

7 Claims, 7 Drawing Sheets

(56) References Cited

FOREIGN PATENT DOCUMENTS

| | | |
|---|---|---|
| JP | 2007-163865 | 6/2007 |
| JP | 2009-163005 | 7/2009 |
| WO | WO2004/017134 A1 | 2/2004 |

OTHER PUBLICATIONS

Nov. 8, 2011 European search report in connection with counterpart European patent application No. 11 15 7826.

* cited by examiner

ELECTROCHROMIC DISPLAY APPARATUS AND METHOD OF MANUFACTURING THE SAME

BACKGROUND OF THE INVENTION

1. Field of the Invention

The present invention generally relates to an electrochromic display apparatus and a method for manufacturing the same.

2. Description of the Related Art

Recently, the amount of development of the electronic paper has been increasing. The electronic paper has been watched as an electronic medium which replaces paper. Since the electronic paper can be treated like the paper, features that are different from those of a CRT or a liquid crystal display are required. For example, features such that the electronic paper is a reflective display, and has high white reflectivity and a high contrast ratio are required. Further, for example, features that the electronic paper is a high definition display, and has a memory effect of display are required. Furthermore, for example, features that the electronic paper can operate at a low voltage, and is thin, light-weight and inexpensive are required. Among these features, there is a high requirement particularly for the white reflectivity and the contrast ratio that are equivalent to those of the paper.

An electronic paper which utilizes, for example, a reflection-type liquid crystal, an electrocataphoresis or a toner migration has been proposed. However, it is difficult to display multicolor while achieving high white reflectivity and high contrast ratio by any type of the electronic paper described above. In general, in order to display multicolor, a color filter is attached to a display apparatus such as the electronic paper. Since the color filter absorbs light, a reflection ratio of the display apparatus is decreased in a case where the color filter is attached to the display apparatus. Since each pixel of the color filter is divided into three parts of red (R), green (G) and blue (B), the reflection ratio of the display apparatus is decreased and thereby the contrast ratio is decreased. In a case where the white reflectivity and the contrast are decreased greatly, visibility of the display apparatus decreases greatly. Thus, it becomes difficult to use the display apparatus as the electronic paper.

On the other hand, there is a promising technique for realizing the reflective display in that an electrochromic phenomenon is utilized and the color filter is not utilized. According to the electrochromic phenomenon, a color which is displayed from an electrochromic compound is changed in a reversible fashion by a reversible oxidation-reduction reaction when a voltage is applied to the electrochromic compound. The electrochromic display apparatus utilizes color change of the reversible oxidation-reduction reaction of the electrochromic compound. The color change is performed by controlling display and nondisplay of the color of the electrochromic compound. Since the electrochromic display apparatus is a reflective display, has a memory effect of display, and can operate at a low voltage, the electrochromic display apparatus has been widely developed as a promising candidate for the electronic paper in a wide variety of fields from material development field to device design field.

However, the electrochromic display apparatus has a disadvantage in that a response speed of changing the display/nondisplay state of color is relatively slow, since the electrochromic display apparatus utilizes the reversible oxidation-reduction reaction. Patent document 1 (for example, Japanese Patent Laid-Open Publication No. 2001-510590) discloses a technique in which the response speed is improved by disposing the electrochromic compound closer to the electrode. According to patent document 1, the response speed is improved from several tens seconds to almost 1 second in the cases where the electrochromic display apparatus displays blue, and the electrochromic display apparatus erases blue. However, the improved response speed is not enough; thus it is necessary to improve still further the response speed in developing the electrochromic display apparatus. Since the electrochromic display apparatus can display various colors by designing compositions of the electrochromic compounds, the electrochromic display apparatus is expected to be used as a multicolor display apparatus.

There are some examples of the multicolor display apparatus which utilize the electrochromic phenomenon. For example, patent document 2 (for example, Japanese Patent Laid-Open Publication No. 2003-121883) discloses a multicolor display apparatus which utilizes electrochromic compound layers that are formed by stacking plural kinds of electrochromic compounds. According to patent document 2, each of the plural electrochromic compounds is included in a functional group. The functional groups are different from each other, and have different voltages that are necessary for displaying colors. Each of the functional groups displays a different color.

Patent document 3 (for example, Japanese Patent Laid-Open Publication No. 2006-106669) discloses a multicolor display apparatus which includes multi-electrochromic layers formed on an electrode. The multicolor display apparatus according to patent document 3 displays multicolor (multiple colors) by utilizing voltage difference or current difference of the multi-electrochromic layers that are necessary for displaying colors. The multi-electrochromic layers are formed by stacking or mixing plural electrochromic compounds. Each layer of the multi-electrochromic layers displays a different color, and voltages and electric charges that are necessary for displaying colors are different from each other.

Patent document 4 (for example, Japanese Patent Laid-Open Publication No. 2003-270671) discloses a multicolor display apparatus which includes plural units of plural pairs of transparent electrodes and plural electrochromic layers. In each unit, the electrochromic layer is held between the pair of the transparent electrodes. The plural units are stacked on each other. Patent document 5 (for example, Japanese Patent Laid-Open Publication No. 2004-151265) discloses a multicolor display apparatus which includes the units of patent document 4 and a passive matrix panel or an active matrix panel. The multicolor display apparatus according to patent document 5 displays three colors corresponding to RGB.

Herein, patent document 6 (for example, Japanese Patent Laid-Open Publication No. 2009-163005) discloses a multicolor electrochromic display apparatus that solves problems described above with regard to patent documents 2 to 5. The multicolor electrochromic display apparatus includes plural display electrodes that are disposed between a display substrate and an opposed electrode and are separated from each other. The multicolor electrochromic display apparatus includes plural electrochromic layers that are formed on the plural display electrodes, respectively.

However, the multicolor electrochromic display apparatus includes problems as described below.

The electrochromic display apparatus was introduced as an electrochemical element which utilizes the Grätzel cell that was introduced in 1991. The electrochromic display apparatus includes a nanoporous particle layer which has a large surface area, and compounds that cause electrochromic reaction. The compounds are attached to or absorbed in the nanoporous particle layer. In a case where the compounds are poorly attached to or absorbed in the nanoporous particle layer, unevenness of compound concentration may occur. In order to cause a sufficient electrochromic reaction, it is necessary for electrolytes of the compounds to penetrate into the nanoporous particle layer. Since the electrochromic display apparatus includes the nanoporous particle layer, gas bubbles may remain in the nanoporous particle layer.

Accordingly, these matters as described above may cause unevenness of display, unevenness of response speed or delay of response of the electrochromic display apparatus. The larger a display area of the electrochromic display apparatus becomes, the more likely those problems are to occur. In a case where plural nanoporous particle layers are stacked, the electrolytes may not penetrate into the plural nanoporous particle layers immediately. Thus, the problems as described above may occur remarkably.

In accordance with a single element of a multifunction electrochemical element in which plural electrochemical function layers are stacked, the plural electrochemical function layers must be sufficiently filled with an electrolyte medium, and ion migration must be performed sufficiently, in order to cause each layer of the plural electrochemical function layers to function.

SUMMARY OF THE INVENTION

It is a general object of the present invention to provide an electrochromic display apparatus and a method of manufacturing the same that can easily cause electrolytes into an electrochromic layer.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by an electrochromic display apparatus and a method for manufacturing the same particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides an electrochromic display apparatus including: a stacked body which includes a display electrode and an electrochromic layer that are stacked on each other; a film which includes through holes, and is disposed on one of the display electrode and the electrochromic layer of the stacked body; and an opposed substrate on which an opposed electrode that faces toward the display electrode is formed.

Another embodiment of the present invention provides a method of forming an electrochromic display apparatus including: a first step of forming a display electrode and an electrochromic layer onto a film, in this order, which film includes through holes; a second step of forming an opposed electrode onto an opposed substrate; and a third step of connecting and sealing the film and the opposed substrate; wherein an electrolyte is supplied between the display electrode and the opposed electrode.

Other objects, features and advantages of the embodiments of the present invention will become more apparent from the following detailed description when read in conjunction with the accompanying drawings.

DESCRIPTION OF THE PREFERRED EMBODIMENTS

Figure 1:
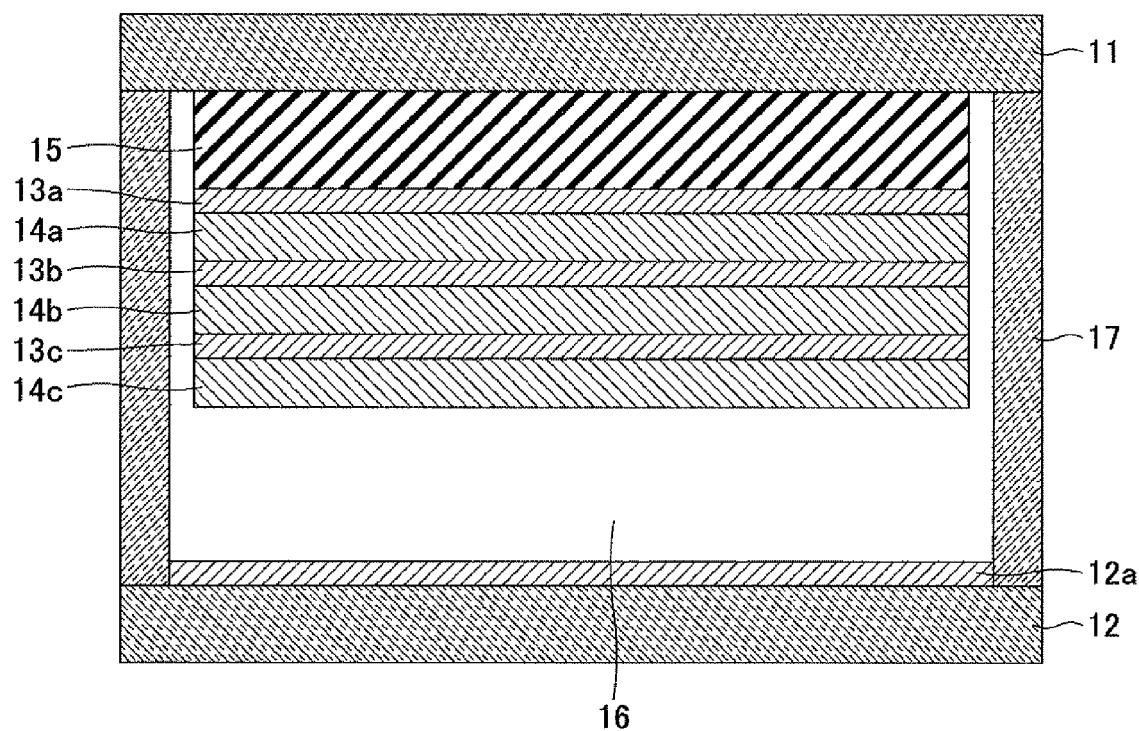
FIG. 1 is a schematic drawing showing an example of a cross-sectional view of an electrochromic display apparatus 10 according to the present embodiment.

In the following, embodiments of the present invention will be described with reference to the accompanying drawings. In FIGS. 1 to 4, the same elements or similar elements are referred to by the same reference numerals, and repetition in a description may be omitted.

FIG. 1 is a schematic drawing showing an example of a cross-sectional view of an electrochromic display apparatus 10 according to the present embodiment. As shown in FIG. 1, the electrochromic display apparatus 10 includes a display substrate 11, an opposed substrate 12, an opposed electrode 12A, a first display electrode 13A, a second display electrode 13B, a third display electrode 13C, a first electrochromic layer 14A, a second electrochromic layer 14B, a third electrochromic layer 14C, a porous film 15, an electrolyte layer 16 and a spacer 17.

The display substrate 11 is made of a transparent material and constitutes a substrate. The upper surface of the display substrate constitutes a display surface in which color(s) is displayed. The porous film 15, the first display electrode 13A, the first electrochromic layer 14A, the second display electrode 13B, the second electrochromic layer 14B, the third display electrode 13C and the third electrochromic layer 14C are formed on the surface, which faces toward the opposed substrate 12, of the display substrate 11 in this order. The opposed substrate 12 is disposed in a location opposite to the display substrate 11. The display substrate 11 and the opposed substrate 12 are connected with each other and sealed by the spacer 17. The opposed substrate 12 faces toward the display substrate 11. The opposed electrode 12A is formed on the surface, which faces toward the display substrate 11, of the opposed substrate 12. Distance between the opposed electrode 12A and the first display electrode 13A, distance between the opposed electrode 12A and the second display electrode 13B, and distance between the opposed electrode 12A and the third display electrode 13C are set to predetermined distances, respectively.

The first display electrode 13A is used for applying voltage to the first electrochromic layer 14A and thereby causing the first electrochromic layer 14A to display color. The voltage applied to the first electrochromic layer 14A is determined by an electric potential of the first display electrode 13A with respect to the opposed electrode 12A. The second display electrode 13B is used for applying voltage to the second electrochromic layer 14B and thereby causing the second electrochromic layer 14B to display color. The voltage applied to the second electrochromic layer 14B is determined by an electric potential of the second display electrode 13B with respect to the opposed electrode 12A. The third display electrode 13C is used for applying voltage to the third electrochromic layer 14C and thereby causing the third electrochromic layer 14C to display color. The voltage applied to the third electrochromic layer 14C is determined by an electric potential of the third display electrode 13C with respect to the opposed electrode 12A.

The first electrochromic layer 14A, the second electrochromic layer 14B, and the third electrochromic layer 14C include electrochromic compounds and metal oxides, respectively. The electrochromic compounds and the metal oxides are in an ideal state in that single molecular electrochromic compounds are absorbed in the metal oxides. The electrochromic compounds display color based on reversible oxidation-reduction reaction. The metal oxides hold the electrochromic compounds and assist in controlling the display/nondisplay state of the electrochromic compounds at high speed. According to the electrochromic display apparatus 10, it becomes possible to control the display/nondisplay state more effectively by supplying electric charges (ions, electrons, holes or the like) to the electrochromic compounds through the respective first display electrodes 13A to 13C and the metal oxides.

Herein, with regard to the first electrochromic layer 14A, the electrochromic compounds and the metal oxides may be mixed and formed as a single layer, as long as the electrochromic compounds are fixed and an electrical connection, between the electrochromic compound and the first display electrode 13A, which is necessary for the reversible oxidation-reduction reaction of the electrochromic compound is maintained. The same applies to the electrochromic compounds and the metal oxides of the second electrochromic layer 14B and the third electrochromic layer 14C. Herein, the first electrochromic layer 14A, the second electrochromic layer 14B and the third electrochromic layer 14C display different colors, respectively.

The electrolyte layer 16 is formed in an area which is surrounded by the display substrate 11, the opposed substrate 12 and spacer 17. The electrolyte layer 16 includes electrolytes and a medium, and carries electrons and holes between the opposed electrode 12A, the first display electrode 13A, the second display electrode 13B and the third display electrode 13C. The first electrochromic layer 14A, the second electrochromic layer 14B and the third electrochromic layer 14C display respective colors when the electric charges are supplied and the reversible oxidation-reduction reaction is caused. Herein, the electrolyte layer 16 includes a white reflector (not shown). Thus, the electrochromic display apparatus 10 constitutes a reflective display element.

Herein, a transparent seal layer may be disposed instead of the display substrate 11. It is possible to seal the electrolyte layer 16 in a case where the transparent seal layer is disposed instead of the display substrate 11. It is possible to suppress ingress of water into the electrochromic display apparatus 10, and to suppress degradation of device characteristics of the electrochromic display apparatus 10 in a case where the transparent seal layer is disposed instead of the display substrate 11. It is preferable to use a layer which has a gas barrier property as the transparent seal layer. Thus, it is preferable to use a polymer coat layer which is made of gas barrier materials and the like as the transparent seal layer. As a material of the transparent seal layer, an acrylic resin, an epoxy resin, or a mixture of an acrylic resin and an epoxy resin may be used. Appropriate filler may be added to the material of the transparent seal layer. Further, as a material of the transparent seal layer, ethylene-vinylalcohol copolymer, vinylidene chloride or cyclic olefin copolymer may be used. In a case where the transparent seal layer is not used instead of the display substrate 11, the display substrate 11 works as the transparent seal layer and seals the electrolyte layer 16.

Respective electric resistances between the first display electrode 13A and the second display electrode 13B, and between the second display electrode 13B and the third display electrode 13C depend on, for example, thicknesses or the like of the first electrochromic layer 14A, the second electrochromic layer 14B and the third electrochromic layer 14C. In a case where insulation between the first display electrode 13A and the second display electrode 13B, and between the second display electrode 13B and the third display electrode 13C is not obtained, it is preferable to form an insulating layer(s) between the first electrochromic layer 14A and the second display electrode 13B and/or between the second electrochromic layer 14B and the third display electrode 13C.

Herein, protection layers that are made of organic polymeric material may be formed between the first electrochromic layer 14A and the second display electrode 13B, between the second electrochromic layer 14B and the third display electrode 13C, and on the surface, which faces toward the opposed substrate 12, of the electrochromic layer 14C. In this case, adhesiveness of the respective electrochromic layers 14A to 14C and adjacent layers thereto is improved. Further, in this case, resistance to dissolving of the first electrochromic layer 14A, the second electrochromic layer 14B and the third electrochromic layer 14C is improved. Furthermore, in this case, it becomes possible to improve insulation properties between the first display electrode 13A and the second display electrode 13B, and between the second display electrode 13B and the third display electrode 13C, and durability of the electrochromic display apparatus 10.

According to the electrochromic display apparatus 10 which includes a composition as described above, it is possible to display multicolor easily. It is possible to control the electric potential of the first display electrode 13A with respect to opposed electrode 12A, the electric potential of the second display electrode 13B with respect to opposed electrode 12A, and the electric potential of the third display electrode 13C with respect to opposed electrode 12A independently. Thus, it is possible to cause the first electrochromic layer 14A, the second electrochromic layer 14B and the third electrochromic layer 14C to display and erase colors independently.

Since the first electrochromic layer 14A, the second electrochromic layer 14B and the third electrochromic layer 14C are stacked on the display substrate 11, it is possible to cause any one of the first electrochromic layer 14A, the second electrochromic layer 14B or the third electrochromic layer 14C to display and erase color. Further, it is possible to cause any two of the first electrochromic layer 14A, the second electrochromic layer 14B or the third electrochromic layer 14C to display and erase colors. Furthermore, it is possible to cause all of the first electrochromic layer 14A, the second electrochromic layer 14B and the third electrochromic layer 14C to display and erase colors. Thus, according to the electrochromic display apparatus 10, it is possible to display multicolor.

For example, three electrochromic layers that display yellow, magenta and cyan respectively may be used as the first electrochromic layer 14A, the second electrochromic layer 14B and the third electrochromic layer 14C respectively. In this case, the electrochromic display apparatus 10 can display full color by controlling the first display electrode 13A, the second display electrode 13B and the third display electrode 13C independently.

Figure 2:
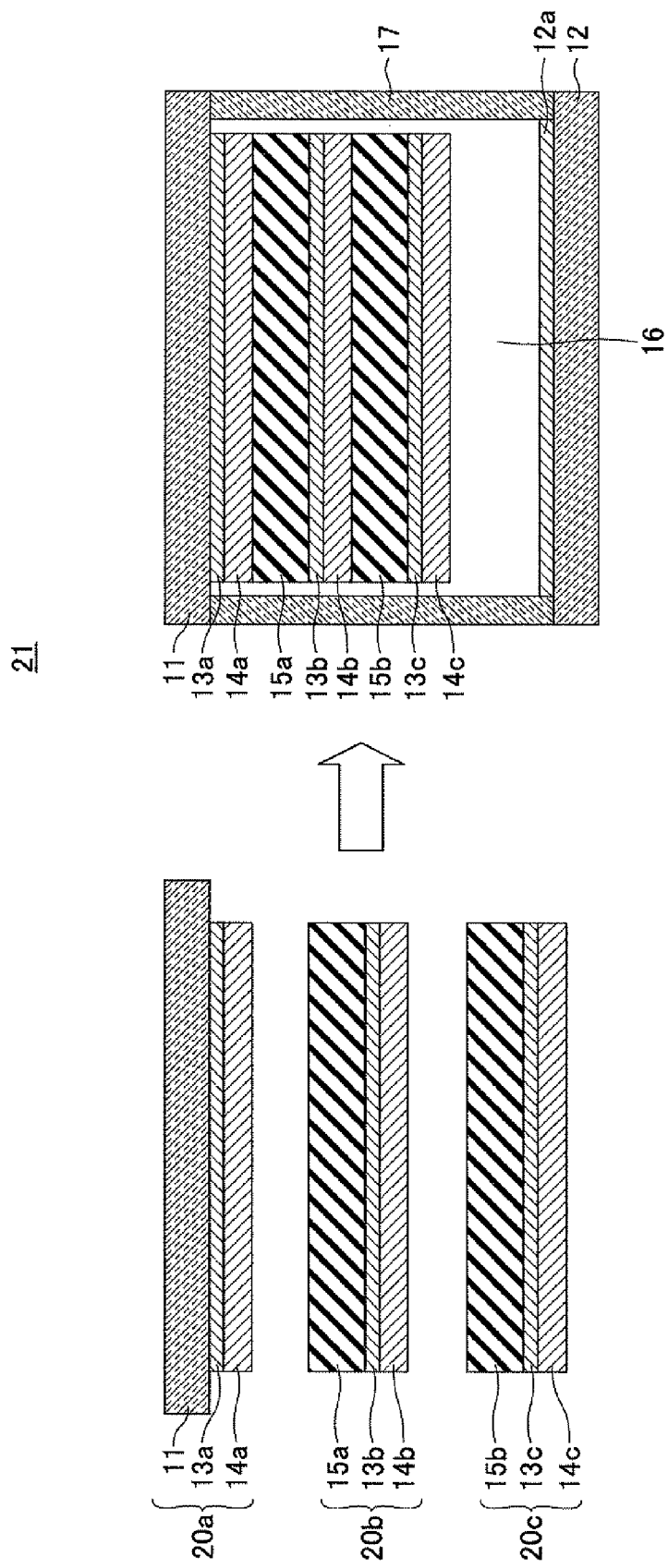
FIG. 2 is a schematic drawing showing an example of a cross-sectional view of electrochromic display elements 20A, 20B and 20C, and an electrochromic display apparatus 21 according to the present embodiment.

FIG. 2 is a schematic drawing showing an example of a cross-sectional view of electrochromic display elements 20A, 20B and 20C, and an electrochromic display apparatus 21 according to the present embodiment. The electrochromic display apparatus 21 has the same configuration as the electrochromic display apparatus 10 except for a first porous film 15A and a second porous film 15B that are formed instead of the porous film 15. The first porous film 15A is inserted between the second display electrode 13B and the first electrochromic layer 14A. The second porous film 15B is inserted between the third display electrode 13C and the second electrochromic layer 14B. The first display electrode 13A is formed onto the surface, which faces toward the opposed substrate 12, of the display substrate 11, since the electrochromic display apparatus 21 does not include the porous film 15 as shown in FIG. 1.

The electrochromic display apparatus 21 has effects similar to the effects of the electrochromic display apparatus 10 as shown in FIG. 1. The electrochromic display apparatus 21 further has effects as described below. The electrochromic display apparatus 21 includes the electrochromic display elements 20A, 20B and 200. The electrochromic display element 20A includes the display substrate 11, the first display electrode 13A and the first electrochromic layer 14A. The electrochromic display element 20B includes the first porous film 15A, the second display electrode 13B and the second electrochromic layer 14B. The electrochromic display element 20C includes the second porous film 15B, the third display electrode 13C and the third electrochromic layer 14C. Herein, the electrochromic display elements 20A, 20B and 20C are formed independently. The electrochromic display element 20A is formed by stacking the display substrate 11, the first display electrode 13A and the first electrochromic layer 14A in this order. The electrochromic display element 20B is formed by stacking the first porous film 15A, the second display electrode 13B and the second electrochromic layer 14B in this order. The electrochromic display element 20C is formed by stacking the second porous film 15B, the third display electrode 13C and the third electrochromic layer 14C in this order. Then, the electrochromic display elements 20A, 20B and 20C are stacked in this order. Thus, it is possible to provide electrical insulation between the first display electrode 13A, the second display electrode 13B and the third display electrode 13C. During the manufacturing process of the second electrochromic layer 14B and the third electrochromic layer 14C, metal oxide particle layers that become the second electrochromic layer 14B and the third electrochromic layer 14C respectively can be formed at the same time, and then the electrochromic compounds are attached to or absorbed in the metal oxide particle layers. Thus the second electrochromic layer 14B and the third electrochromic layer 14C can be formed at the same time. It is possible to form the electrochromic display apparatus 21 easily.

FIGS. 3A to 3H are schematic drawings showing examples of cross-sectional views of electrochromic display apparatuses according to another embodiment. A third porous film 15C which is included in the electrochromic display apparatuses as shown in FIGS. 3D, 3E, 3G and 3H, is a porous film similar to the porous film 15 as shown in FIG. 1, the first porous film 15A and a second porous film 15B as shown in FIG. 2.

FIGS. 3A to 3H respectively show parts of the electrochromic display apparatuses. The electrochromic display apparatuses as shown in FIGS. 3A to 3H have effects similar to the effects of the electrochromic display apparatuses 10 and 21 as shown in FIGS. 1 and 2, respectively. The electrochromic display apparatuses as shown in FIGS. 3A to 3H are variations that are modified from the point of view of, for example, light loss caused by light scattering in the porous film 15, simplification of manufacturing processes or the like. Herein, the number of the electrochromic layers is not limited to three. The number of the electrochromic layers may be varied in accordance with color variations of the electrochromic display apparatus, functions of the electrochromic display apparatus or the like.

Hereinafter, materials of the elements as shown in FIGS. 1 to 3H will be described.

The display substrate 11 is constituted of, for example, a glass substrate or a plastic substrate that is made of transparent material. As the transparent material of the plastic substrate, for example, polycarbonate, polyethylene, polystyrene, polyethylene terephthalate, polytrimethylene terephthalate, polybutylene terephthalate, polyethylene naphthalate, polybutylene naphthalate or the like may be used. It is possible to manufacture the electrochromic display apparatus which includes advantages of lightness and flexibility by using the plastic substrate as the display substrate 11.

Material of the first display electrode 13A, the second display electrode 13B and the third display electrode 13C, requires electrical conductivity and transparency, since the electrochromic display apparatus requires light transmission properties. As material of the first display electrode 13A, the second display electrode 13B and the third display electrode 13C, transparent conducting materials may be used. It is possible to improve visibility of color by using the transparent conducting materials.

As transparent conducting material, inorganic material such as ITO (indium tin oxide) which is formed by doping stannum (Sn) into indium oxide, FTO which is formed by doping fluorine into tin oxide, ATO which is formed by doping antimony into tin oxide or the like may be used. It is preferable to use inorganic material which includes any one of indium oxide, tin oxide and zinc oxide that are formed by vacuum deposition as the transparent conducting material. Indium oxide layer, tin oxide layer and zinc oxide layer can be easily formed by sputtering, and provide enhanced transparency and electrical conductivity. The preferable transparent conducting material, for the first display electrode 13A, the second display electrode 13B and the third display electrode 13C, is InSnO, GaZnO, SnO, $In_2O_3$ and ZnO.

As the opposed substrate 12, a glass substrate or a plastic film may be used. Material of the opposed electrode 12A, requires electrical conductivity. In a case where the glass substrate or the plastic film is used as the opposed substrate 12, a transparent conductive film such as ITO, FTO, zinc oxide or the like, a conductive metal film such as zinc, platinum or the like, or a carbon film may be used as the opposed electrode 12A. Those films may be formed by coating respective materials onto the surface of the opposed substrate 12. Herein, the opposed electrode 12A is combined with the opposed substrate 12, in a case where the opposed substrate 12 is constituted of metallic plate such as a plate made of zinc.

In a case where the material of the opposed electrode 12A causes an inverse reaction of oxidation-reduction reaction which is caused by the first electrochromic layer 14A, the second electrochromic layer 14B and the third electrochromic layer 14C, it is possible to display color and erase color stably. In a case where the first electrochromic layer 14A, the second electrochromic layer 14B and the third electrochromic layer 14C display colors by oxidation reaction, the electrochromic display apparatus can display color and erase color stably by including the opposed electrode 12A which causes reduction reaction. On the contrary, in a case where the first electrochromic layer 14A, the second electrochromic layer 14B and the third electrochromic layer 14C display colors by reduction reaction, the electrochromic display apparatus can display color and erase color stably by including the opposed electrode 12A which causes oxidation reaction.

As material of the first electrochromic layer 14A, the second electrochromic layer 14B and the third electrochromic layer 14C, a material which displays color and erases color based on the oxidation reaction or the reduction reaction is used. An electrochromic compound such as a polymer series compound, a pigment system compound, a metallic complex compound, a metallic oxide or the like may be used as the material of the first electrochromic layer 14A, the second electrochromic layer 14B and the third electrochromic layer 14C.

For example, as the polymer series compound or the pigment system compound, a low molecular series organic electrochromic compound such as azobenzene series, anthraquinone series, diarylethene series, dihydroprene series, styryl series, styryl spiropyran series, spiroxazine series, spirothiopyran series, thioindigoid series, tetrathiafulvalene series, terephthalic acid series, triphenylmethane series, triphenylamine series, naphthopyran series, viologen series, pyrazoline series, phenazine series, phenylenediamine series, phenoxazine series, phenothiazine series, phthalocyanine series, fluoranthene series, fulgide series, benzopyran series, metallocene series or the like may be used. Further, for example, as the polymer series compound or the pigment system compound, a conductive polymer molecule compound such as polyaniline or polythiophene may be used.

It is preferable that the polymer series compound or the pigment system compound includes a bipyridine series compound as shown in chemical formula 1. Since these materials as described above display and erase color at low voltage, it is possible to display enhanced color at a reduction potential in a case where the electrochromic display apparatus includes plural display electrodes.

<Chemical formula 1>

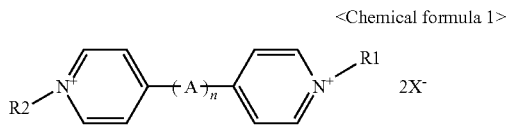

Herein, groups R1 and R2 as shown in chemical formula 1 indicate an alkyl group and an aryl group, respectively, that may include a substituent group independently and that include a carbon number from 1 to 8. At least one of the groups R1 and R2 includes a substituent group selected from COOH, PO(OH)$_2$ or Si(OC$_k$H$_{2k+1}$)$_3$. X as shown in chemical formula 1 indicates a univalency anion, and n as shown in chemical formula 1 indicates any number of 0, 1 or 2. A as shown in chemical formula 1 indicates an alkyl group, an aryl group or a heterocyclic group that may include substituent groups and that include a carbon number from 1 to 20.

These compounds as described above are formed and attached onto the first display electrode 13A, the second display electrode 13B and the third display electrode 13C, respectively. It is preferable that the compounds are formed and attached onto the first display electrode 13A, the second display electrode 13B and the third display electrode 13C, respectively, in a state that the compounds are absorbed in or attached to a nanoporous semiconductor material. Herein, the electrochromic compounds and the nanoporous semiconductor material may be mixed and formed as a single layer, as long as the electrochromic compounds are fixed and an electrical connection which is necessary for the reversible oxidation-reduction reaction of the electrochromic compound is maintained.

As a material of the nanoporous semiconductor material, a metallic oxide of which the main component may be titanium oxide, zinc oxide, tin oxide, aluminum oxide (alumina), zirconium oxide, cerium oxide, silicon oxide (silica), yttrium oxide, boron oxide, magnesium oxide, strontium titanate, potassium titanate, barium titanate, calcium titanate, calcium oxide, ferrite, hafnium oxide, indium oxide, tungsten oxide, iron oxide, copper oxide, nickel oxide, cobalt oxide, barium oxide, strontium oxide, vanadium oxide, calcium aluminosilicate, calcium phosphate, aluminosilicate or the like, may be used.

Herein, these metallic oxides may be used solely or in a mixed state including at least two metallic oxides. It is possible to display multicolor with enhanced response speed in a case where any one or a mixture that is selected particularly from titanium oxide, zinc oxide, tin oxide, alumina, zirconium oxide, iron oxide, magnesium oxide, indium oxide and tungsten oxide is used as the nanoporous semiconductor material. These nine metallic oxides are selected from the point of view of an electrical characteristic such as electrical conductivity and a physical characteristic such as an optical property. Herein, it is preferable to use the nanoporous semiconductor material which has a configuration that has a larger surface area per unit volume, so that the nanoporous semiconductor material can hold the electrochromic compounds efficiently. It is possible to display color with enhanced contrast ratio, since the electrochromic compounds are efficiently held by the nanoporous semiconductor material which has larger surface area per unit volume.

Preferable thicknesses of the first electrochromic layer 14A, the second electrochromic layer 14B and the third electrochromic layer 14C are, for example, from 0.2 μm to 0.5 μm. It may become difficult to obtain sufficient color optical density, if the thickness of the first electrochromic layer 14A, the second electrochromic layer 14B and the third electrochromic layer 14C become less than 0.2 μm. On the contrary, manufacturing cost increases and it may become difficult to obtain sufficient visibility, if the thickness of the first electrochromic layer 14A, the second electrochromic layer 14B and the third electrochromic layer 14C become greater than 0.5 μm.

It is necessary that the respective electric resistances between the first display electrode 13A and the second display electrode 13B, and between the second display electrode 13B and the third display electrode 13C are large enough so that electric potentials of the first display electrode 13A, the second display electrode 13B and the third display electrode 13C with respect to opposed electrode 12A can be controlled independently. It is necessary to form the electric resistances between the first display electrode 13A and the second display electrode 13B, and between the second display electrode 13B and the third display electrode 13C greater than at least any one of sheet resistances of the first display electrode 13A, the second display electrode 13B and the third display electrode 13C.

When a certain voltage is supplied to any one of the first display electrode 13A, the second display electrode 13B and the third display electrode 13C, a voltage similar to the certain voltage is supplied to the other two electrodes, in a case where the electric resistances between the first display electrode 13A and the second display electrode 13B, and between the second display electrode 13B and the third display electrode 13C are less than any one of sheet resistances of the first display electrode 13A, the second display electrode 13B and the third display electrode 13C. In this case, it is difficult to erase colors of the first electrochromic layer 14A, the second electrochromic layer 14B and the third electrochromic layer 14C independently. It is preferable to set the electric resistances between the first display electrode 13A and the second display electrode 13B, and between the second display electrode 13B and the third display electrode 13C five hundred times more than the respective sheet resistances of the first display electrode 13A, the second display electrode 13B and the third display electrode 13C. In order to increase the resistances as described above, it is preferable to form insulating layers therebetween.

Material of the insulating layers is preferably constituted of a porous material, but is not limited to the porous material. As the material of the insulating layers, a material which has enhanced insulating characteristics and durability, and which is easy to deposite may be used. Particularly, a material which includes at least ZnS may be used as the material of the insulating layers. ZnS has an advantage that it is possible to deposit ZnS by sputtering at high speed without damaging the electrochromic layer. Further, ZnO—$SiO_2$, ZnS—SiC, ZnS—Si or ZnS—Ge may be used as a material of the insulating layers, which includes ZnS as a main component.

It is preferable to keep content percentage of ZnS from about 50 mol % to 90 mol %, in order to keep crystalline characteristics of the insulating layers when the insulating layers are formed. Thus, in particular, the preferable materials of the insulating layers are ZnS—$SiO_2$ (8/2), ZnS—$SiO_2$ (7/3), ZnS, and ZnS—ZnO—$In_2O_3$—$Ga_2O_3$ (60/23/10/7). Figures in parentheses indicate a ratio of components. It is possible to suppress degradation of strength of the insulating layers by using the materials as described above, when the insulating layers are stacked with the display electrodes and the electrochromic layers. The degradation of strength of the insulating layers may result in peeling of the insulating layers, the display electrodes, the electrochromic layers or the like.

Herein, it is possible to form the insulating layers as porous layers by forming the insulating layers as films which are made of particles. By forming a foundation layer which is made of particles before sputtering ZnS, it becomes possible to form a porous film which includes ZnS. Herein, the foundation layer may be made of the nanoporous semiconductor materials. The insulating layers which include silica, alumina or the like can be formed. It becomes possible to cause electrolytes which are included in the electrolyte layer 16 to penetrate into the insulating layers by using the insulating layers made of porous films. Thus, electrical charges, such as ions, that are supplied from the electrolyte layer can move easily when the oxidation-reduction reaction is caused. Accordingly, it becomes possible to display multicolor with enhanced response speed. The insulating layer may be stacked and/or mixed with a thin polymer layer.

Thickness of the insulating layer may be set from 20 nm to 500 nm, and more preferably set from 20 nm to 150 nm. It may become difficult to obtain sufficient insulating characteristics if the thickness of the insulating layer becomes less than 20 nm. On the contrary, manufacturing cost increases and it may become difficult to obtain sufficient visibility, if the thickness of the insulating layer becomes greater than 500 nm.

A layer in which a supporting electrolyte salt is dissolved into a medium may be used as the electrolyte layer 16. As material of the supporting electrolyte salt of the electrolyte layer 16, for example, an inorganic ion salt such as an alkali metal salt or an alkaline-earth metal salt, quaternary ammonium salt, acids or alkali supporting electrolyte salt may be used. Particularly, $LiClO_4$, $LiBF_4$, $LiAsF_6$, $LiPF_6$, $LiCF_3SO_3$, $LiCF_3COO$, KCl, $NaClO_3$, NaCl, $NaBF_4$, NaSCN, $KBF_4$, $Mg(ClO_4)_2$, $Mg(BF_4)_2$ or perchloric acid tetrabutylammonium may be used as the material of the supporting electrolyte salt of the electrolyte layer 16.

As the medium of the electrolyte layer 16, propylene carbonate, acetonitrile, gamma-butyrolactone, ethylene carbonate, sulfolane, dioxolan, tetrahydrofuran, 2-methyltetrahydrofuran, dimethylsulfoxide, 1,2-dimethoxyethane, 1,2-ethoxylmethoxyethane, polyethyleneglycol, alcohol or the like may be used. The electrolyte layer 16 is not limited to the layer, in the form of liquid, in which the supporting electrolyte salt is dissolved into the medium as described above. A gelatinous electrolyte or a solid electrolyte such as polymer electrolyte may be used as the electrolyte layer 16.

From the point of view of improved strength of the element and improved reliability, it is preferable to use the gelatinous electrolyte or the solid electrolyte as the electrolyte layer 16. The solid electrolyte can be formed by holding the electrolytes and the medium into a polymer resin. In this case, high ion conductivity and improved strength can be obtained. It is preferable to use a light curing resin as the polymer resin. It is possible to form the electrolyte layer 16 at lower temperature and in a shorter time than forming the electrolyte layer 16 by utilizing heat polymerization or vaporization of a medium in order to form a thin film.

As the polymer resin, a polymer such as urethane, ethylene glycol, propylene glycol, vinyl alcohol, acrylic, epoxy resin or the like may be used. It becomes possible to obtain a function of white reflect layer by dispersing white pigment particles into the electrolyte layer 16. As material of the white pigment particles, a metallic oxide such as titanium oxide, aluminum oxide, zinc oxide, silicon oxide, cesium oxide, yttrium oxide may be used. In a case where the electrolyte layer 16 is cured by the light curing resin, light may be shielded if the amount of white pigment particles is increased greatly. In this case, defects of curing may occur. A preferable contained amount of the white pigment particles is from 10 wt % to 50 wt %, even though the contained amount depends on thickness of the electrolyte layer 16. The thickness of the electrolyte layer 16 may be set from 0.1 μm to 200 μm. Preferable thickness of the electrolyte layer 16 is from 1 μm to 50 μm. The electric charges become diffuse if the thickness is greater than 200 μm. On the contrary, it becomes difficult to hold the electrolytes if the thickness becomes less than 0.1 μm.

The porous film 15, the first porous film 15A, the second porous film 15B and the third porous film 15C are inactive with the electrolytes included in the electrolyte layer 16. The porous film 15, the first porous film 15A, the second porous film 15B and the third porous film 15C may be made of, for example, polyolefin, polycarbonate, polyester, polymethacrylate, polyacetal, polyvinylidene chloride, polyvinylidene fluoride, polytetrafluoroethylene, polyurethane or the like. Among these materials, it is preferable to use polyolefin, polyvinylidene fluoride or polytetrafluoroethylene from the point of view of chemical stability and electric insulation properties.

Hereinafter, configuration of the porous film 15 will be described as a representative of a group including the porous film 15, the first porous film 15A, the second porous film 15B and the third porous film 15C. The first porous film 15A, the second porous film 15B and the third porous film 15C have the same configuration as the porous film 15. The porous film 15 has lots of through holes. A nonwoven textile or a self-supported film may be used as the porous film 15. The self-supported film includes lots of through holes that are formed by heavy ion beam irradiation. It is preferable to form the through holes of the porous film 15 mainly in the direction of thickness of the porous film 15 rather than random directions such as diagonal directions, directions parallel to the surfaces, directions of thickness or the like. This is done to obtain functions and effects as will be described hereinafter. The through holes of the porous film 15 have a function of letting out gas from the porous film 15 when the electrolytes have penetrated into the electrochromic layer which constitutes the nanoporous layer. The through holes constitute fine pore portions. It becomes possible to suppress occurrence of unevenness of display, unevenness of response speed, delay of response of the electrochromic display apparatus or the like by letting out the gas via the through holes of the porous film 15. Further, the through holes have a function of electrolyte ion conduction holes; thus it becomes possible to cause electrochemical reactions even when plural of the porous films are stacked. In a case of manufacturing the single element of the multifunction electrochemical element in which the plural electrochemical function layers are stacked, it is not necessary to stack plural layers in order to form the porous film 15, by using the self-supported film as the porous film 15. Thus, it becomes possible to manufacture the multifunction electrochemical element easily.

It is preferable that the nonwoven textile is made from ultrafine fibers and has uniform porous patterns. The nonwoven textile preferable has thickness from about 5 μm to about 500 μm, more preferably from about 10 μm to about 150 μm, fiber diameter from about 0.2 μm to about 15 μm, more preferably from about 0.5 μm to about 5 μm, and porosity from about 40% to about 90%, more preferably from about 60% to about 80%. Responsiveness of the electrochromic display apparatus is impaired if the textile thickness becomes greater than 500 μm. If the textile thickness becomes less than 5 μm, the strength of the porous filter 15 becomes insufficient, and thereby it becomes difficult to handle and manufacture the electrochromic display apparatus. The porosity becomes insufficient if the fiber diameter becomes greater than 15 μm. The strength of the porous filter 15 becomes insufficient if the fiber diameter becomes less than 0.2 μm. The strength of the porous filter becomes insufficient if the porosity becomes greater than 90%. The ion conductivity becomes insufficient if the porosity becomes less than 40%.

Diameters of the through holes that are formed through a plastic substrate are preferably from about 0.01 μm to about 100 μm, for example. If the diameter becomes less than 0.01 μm, it becomes difficult to form the through holes, i.e. the holes may not be formed through the plastic substrate. Further, in this case, the through holes may be filled with the materials of the transparent electrode such as ITO or the like, even though the holes are formed through the plastic film. If the diameter of the through holes becomes greater than 100 μm, the through holes become visible, because the diameter becomes close to a size of a pixel of a display, in general. Thus, it becomes difficult to form the display electrodes onto the through holes, and thereby the visibility of the electrochromic display apparatus may be decreased greatly. Thus, it is preferable to set the diameter of the through holes from about 0.1 μm to about 5 μm, in order to fully solve the problems as described above. Since the porous film 15 as described above has the surface with an enhanced flatness, it becomes easy to form the display electrode which has an enhanced conductivity onto the surface of the porous film 15. Thus, it becomes possible to manufacture the electrochromic display apparatus with enhanced visibility.

The ratio of a total surface area of the through holes to a total surface area of the porous film 15 may be varied. The ratio may be set, for example, from about 0.01% to about 30%. As the ratio becomes larger, a surface of portion in which the display electrodes are not formed becomes larger. Thus, it becomes difficult to control the display/nondisplay state, since display response which corresponds to current response may be impaired. On the contrary, if the ratio becomes less than a designated ratio, permeability of the electrolyte ions may be impaired. Thus, it becomes difficult to control the display/nondisplay state.

The porous film 15 includes a part of the materials that form the electrochromic layer, i.e. the electrochromic compounds and the metallic oxides that hold the electrochromic compounds. For example, when a film made of titanium oxide particles, which constitutes the electrochromic layer, is formed onto the porous film 15, the titanium oxide particles enter into the through holes of the porous film 15, and thereby the porous film 15 becomes a state in which the porous film 15 includes the part of the materials that form the electrochromic layer in the through holes. Thus, it becomes possible to display and erase colors efficiently by causing the porous film 15, which holds the electrolytes, to include the part of the materials that form the electrochromic layer in the through holes.

According to the present embodiment, the electrochromic display apparatus includes the porous film which is formed on either of the display electrode or the electrochromic layer of the stacked body of the display electrode and the electrochromic layer. It becomes possible to form vent holes of gas when the electrolytes have penetrated into the electrochromic layer which constitutes the nanoporous layer. Thus, it becomes possible for the electrolytes to penetrate into the electrochromic layer sufficiently. Accordingly, it becomes possible to suppress occurrence of unevenness of display, unevenness of response speed, and delay of response of the electrochromic display apparatus.

Since the electrolytes penetrate into the electrochromic layer quickly, the greater advantages are obtained, particularly in a case where the plural electrochromic layers are stacked in order to display multicolor.

<First Embodiment>
<Formation of the Display Electrode and the Electrochromic Layer>

A glass substrate which is 40 mm long and 40 mm wide is used as the display substrate 11. Polyethylene porous film (SUN MAP LC series, NITTO DENKO CO. LTD.) which is 30 mm long and 30 mm wide is used as the porous film 15. The polyethylene porous film is fixed onto the glass substrate by tapes. Then an ITO layer, which becomes the first display electrode 13A, is deposited onto the polyethylene porous film by sputtering. The ITO layer is 16 mm long, 23 mm wide and 100 nm thick. Resistance of the ITO layer which constitutes the first display electrode 13A is about 200Ω.

A titanium oxide nanoparticle dispersion liquid (SP210, SHOWA TITANIUM CO. LTD.) is painted onto the first display electrode 13A by a spin-coating method, and then an annealing treatment is performed at 120° C. for 15 minutes in order to form a titanium oxide particle film. An application liquid, in which viologen compounds are dispersed into a 2,2,3,3-tetrafluoropropanol liquid solution as shown in chemical formula 2, is painted onto the titanium oxide particle film, by the spin-coating method. Then an annealing treatment is performed at 120° C. for 10 minutes in order to form the first electrochromic layer 14A. The first electrochromic layer 14A is constituted of the titanium oxide particle film and the electrochromic compounds (the viologen compounds). Herein, the application liquid has 0.8 wt %. Then the porous film 15, the first display electrode 13A and the first electrochromic layer 14A are peeled off from the display substrate 11.

<Chemical formula 2>

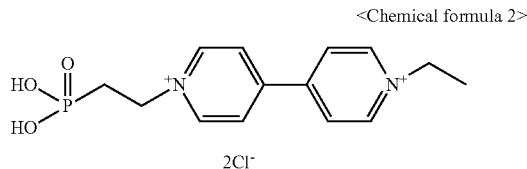 [SMILES: CC[n+]1ccc(-c2cc[n+](CCP(=O)(O)O)cc2)cc1]

2Cl⁻

<Formulation of the Opposed Electrode>

A polycarbonate substrate which is 20 mm long and 30 mm wide is used as the opposed substrate 12. A transparent conductive thin film which is made from tin oxide is deposited onto the whole surface of the polycarbonate substrate in order to form the opposed electrode 12A.

<Formation of the Electrochromic Display Apparatus>

The polyethylene porous film which is stacked with the ITO layer and the first electrochromic layer 14A is mounted onto the opposed electrode 12A, and then an electrolyte solution in which perchloric acid tetrabutylammonium is dissolved into dimethylsulfoxide by 0.1 M is dropped thereinto.

The electrochromic display apparatus according to the first embodiment includes the stacked configuration of the opposed substrate 12, the opposed electrode 12A, the porous film 15, the first display electrode 13A and the first electrochromic layer 14A.

A voltage is applied to the electrochromic display apparatus according to the first embodiment in order to evaluate color displayed therefrom. The voltage of 3.0 V is applied to the electrochromic display apparatus for two seconds. Herein, the first display electrode 13A is connected to the minus terminal of a power source, and the opposed electrode 12A is connected to the plus terminal of the power source.

Figure 4:
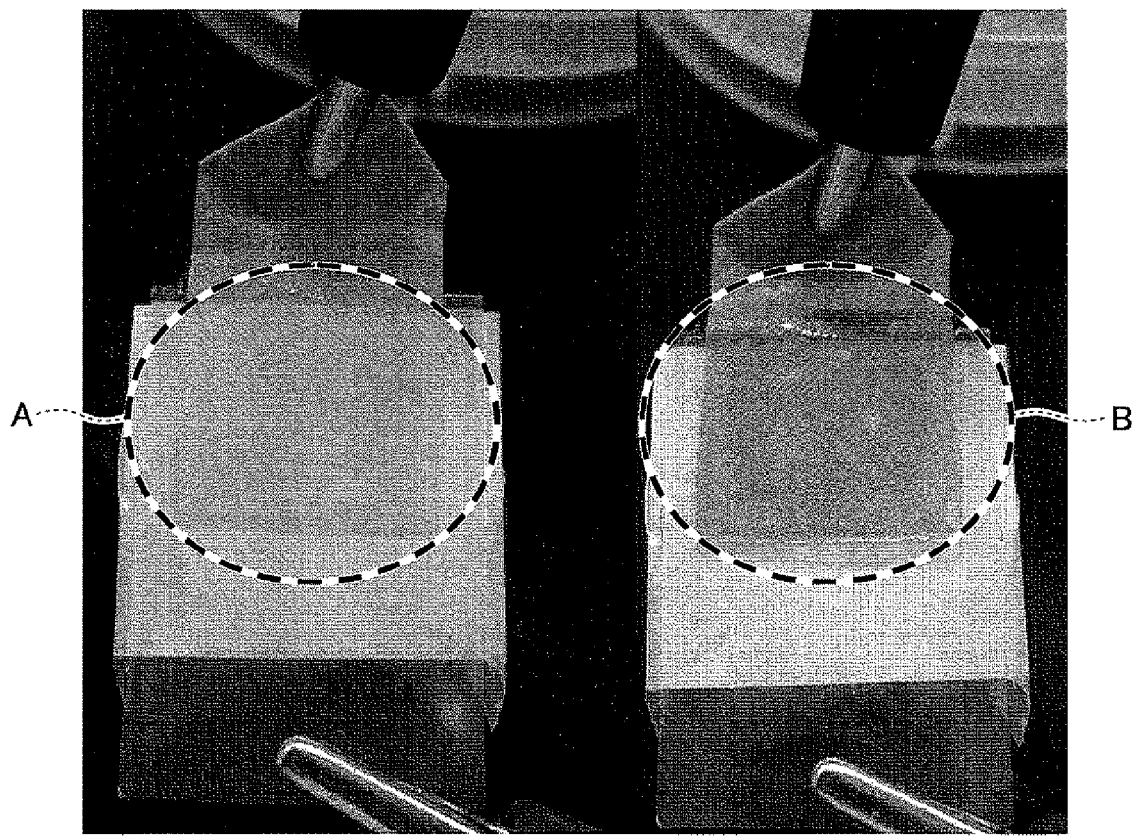
FIG. 4 shows a display state and a nondisplay state of the electrochromic display apparatus according to the first embodiment.

FIG. 4 shows a display state and a nondisplay state of the electrochromic display apparatus according to the first embodiment. The display state is indicated by dotted line A, and the nondisplay state is indicated by dotted line B. In the display state, the voltage is applied between the opposed electrode 12A and the first display electrode 13A; thus the electrochromic display apparatus according to the first embodiment displays color. In the nondisplay state, the voltage is not applied between the opposed electrode 12A and the first display electrode 13A; thus the electrochromic display apparatus according to the first embodiment does not display color, i.e. erases color. In the display state, the electrochromic display apparatus according to the first embodiment displays blue. As shown in FIG. 4, the electrochromic display apparatus according to the first embodiment displays blue and erases blue and holds the display state stably.

Second Embodiment

<Formation of the Display Electrode and the Electrochromic Layer>

A glass substrate which is 40 mm long and 40 mm wide is used as the display substrate 11. An ITO layer, which becomes the first display electrode 13A, is deposited onto the glass substrate by sputtering. The ITO layer has 100 nm thick. Resistance of the ITO layer which constitutes the first display electrode 13A is about 200Ω.

A titanium oxide nanoparticle dispersion liquid (SP210, SHOWA TITANIUM CO. LTD.) is painted onto the first display electrode 13A by the spin-coating method, and then an annealing treatment is performed at 120° C. for 15 minutes in order to form a titanium oxide particle film. An application liquid, in which viologen compounds are dispersed into 2,2,3,3-tetrafluoropropanol liquid solution as shown in chemical formula 3, is painted onto the titanium oxide particle film by the spin-coating method. Then an annealing treatment is performed at 120° C. for 10 minutes in order to form the first electrochromic layer 14A. The first electrochromic layer 14A is constituted of the titanium oxide particle film and the electrochromic compounds (the viologen compounds). Herein, the application liquid has 1.0 wt %.

<Chemical formula 3>

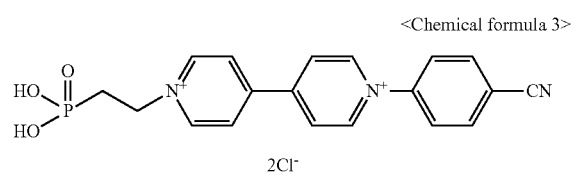

2Cl⁻

A polyethylene porous film (SUN MAP LC series, NITTO DENKO CO. LTD.) is fixed onto a glass substrate by tapes. The glass substrate is 40 mm long and 40 mm wide. The polyethylene porous film which is 30 mm long and 30 mm wide is used as the second porous film 15B. Then an ITO layer, which becomes the second display electrode 13B, is deposited onto the polyethylene porous film by sputtering. The ITO layer is 16 mm long, 23 mm wide and 100 nm thick. Resistance of the ITO layer which constitutes the second display electrode 13B is about 200Ω.

A titanium oxide nanoparticle dispersion liquid (SP210, SHOWA TITANIUM CO. LTD.) is painted onto the second display electrode 13B by the spin-coating method, and then an annealing treatment is performed at 120° C. for 15 minutes in order to form a titanium oxide particle film. An application liquid, in which viologen compounds are dispersed into 2,2,3,3-tetrafluoropropanol liquid solution as shown in chemical formula 4, is painted onto the titanium oxide particle film by the spin-coating method. Then an annealing treatment is performed at 120° C. for 10 minutes in order to form the second electrochromic layer 14B. The second electrochromic layer 14B is constituted of the titanium oxide particle film and the electrochromic compounds (the viologen compounds). Herein, the application liquid has 1.0 wt %. Then the second porous film 15B, the second display electrode 13B and the second electrochromic layer 14B are peeled off from the glass substrate.

<Chemical formula 4>

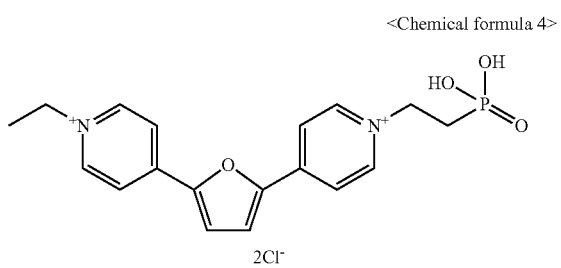 [SMILES: CC[n+]1ccc(-c2ccc(-c3cc[n+](CCP(=O)(O)O)cc3)o2)cc1]

2Cl⁻

<Formulation of the Opposed Electrode>

A glass substrate which is 40 mm long and 40 mm wide is used as the opposed substrate 12. A transparent conductive thin film which is made of tin oxide is deposited onto the whole surface of the glass substrate in order to form the opposed electrode 12A. A dispersion liquid, in which tin oxide particles (Mitsubishi Materials CO. LTD.) are dispersed into 2,2,3,3-tetrafluoropropanol liquid solution is painted onto the transparent conductive thin film by the spin-coating method. First particle size of the tin oxide particles is 30 nm. The dispersion liquid has 20 wt %. Then an annealing treatment is performed at 120° C. for 10 minutes in order to form the opposed electrode 12A which has 2 μm thick.

<Formation of the Electrochromic Display Apparatus>

The polyethylene porous film (the second porous film 15B) which is stacked with the ITO layer and the second electrochromic layer 14B is mounted onto the opposed electrode 12A, and then an electrolyte solution in which perchloric acid tetrabutylammonium is dissolved into dimethylsulfoxide by 0.1 M is dropped thereinto. The opposed substrate 12 and the display substrate 11 are connected with each other and sealed by the spacer 17 in order to form the electrochromic display apparatus according to second embodiment. The spacer 17 has 75 μm thick.

The electrochromic display apparatus according to the second embodiment includes the stacked configuration of the display substrate 11, the first display electrode 13A and the first electrochromic, layer 14A, and the stacked configuration of the opposed substrate 12, the opposed electrode 12A, the porous film 15, the second display electrode 13B, the second electrochromic layer 14B.

<Resistance Between the Display Electrodes>

Resistance between the first display electrode 13A and the second display electrode 13B shows greater than 100 kΩ. Thus, the resistance which is five hundred times more than the respective sheet resistances of the first display electrode 13A and the second display electrode 13B is obtained. Enhanced electric insulation between the display electrodes is obtained.

A voltage is applied to the electrochromic display apparatus according to the second embodiment in order to evaluate color displayed therefrom. The voltage of 3.0 V is applied to the electrochromic display apparatus for two seconds. Herein, the first and second display electrodes 13A and 13B are connected to the minus terminal of a power source, and the opposed electrode 12A is connected to the plus terminal of the power source.

In the display state of green, the voltage is applied between the opposed electrode 12A and the first display electrode 13A; thus the electrochromic display apparatus according to the second embodiment displays green. In the display state of magenta, the voltage is applied between the opposed electrode 12A and the second display electrode 13B; thus the electrochromic display apparatus according to the second embodiment displays magenta. In the nondisplay state, the voltage is not applied between the opposed electrode 12A and the first display electrode 13A, and between the opposed electrode 12A and the second display electrode 13B; thus the electrochromic display apparatus according to the second embodiment does not display color, i.e. erases color. In the display states, the electrochromic display apparatus according to the second embodiment displays blue and magenta, respectively. The electrochromic display apparatus according to the second embodiment displays blue and magenta independently, erases colors and holds the display states stably.

<Third Embodiment>

<Formation of the Display Electrode and the Electrochromic Layer>

A glass substrate which is 40 mm long and 40 mm wide is used as the display substrate 11. Polyethylene porous film (SUN MAP LC series, NITTO DENKO CO. LTD.) which is 30 mm long and 30 mm wide is used as the porous film 15. The polyethylene porous film is fixed onto the glass substrate by tapes. Then an ITO layer, which becomes the first display electrode 13A, is deposited onto the polyethylene porous film by sputtering. The ITO layer is 16 mm long, 23 mm wide and 100 nm thick. Resistance of the ITO layer which constitutes the first display electrode 13A is about 200Ω.

A titanium oxide nanoparticle dispersion liquid (SP210, SHOWA TITANIUM CO. LTD.) is painted onto the first display electrode 13A by the spin-coating method, and then an annealing treatment is performed at 120° C. for 15 minutes in order to form a titanium oxide particle film. An application liquid, in which viologen compounds are dispersed into 2,2,3,3-tetrafluoropropanol liquid solution as shown in chemical formula 2, is painted onto the titanium oxide particle film, by the spin-coating method. Then an annealing treatment is performed at 120° C. for 10 minutes in order to form the first electrochromic layer 14A. The first electrochromic layer 14A is constituted of the titanium oxide particle film and the electrochromic compounds (the viologen compounds). Herein, the application liquid has 0.8 wt %.

A liquid, in which aqueous polyester series urethane resins (HW350 DIC CO. LTD.) are dissolved into 2,2,3,3-tetrafluoropropanol liquid solution, is painted onto the first electrochromic layer 14A, by the spin-coating method, in order to form a protection layer. Herein, the liquid has 0.5 wt %.

An inorganic insulating layer which is constituted of $ZnS$—$SiO_2$ (8/2) is deposited onto the protection layer by sputtering. The insulating layer has 140 nm thick. Then an ITO layer, which becomes the second display electrode 13B, is deposited onto the insulating layer by sputtering. The ITO layer is 10 mm long, 20 mm wide and 100 nm thick. Resistance of the ITO layer which constitutes the second display electrode 13B is about 200Ω.

A titanium oxide nanoparticle dispersion liquid (SP210, SHOWA TITANIUM CO. LTD.) is painted onto the second display electrode 13B by the spin-coating method, and then an annealing treatment is performed at 120° C. for 15 minutes in order to form a titanium oxide particle film. An application liquid, in which viologen compounds are dispersed into 2,2,3,3-tetrafluoropropanol liquid solution as shown in chemical formula 3, is painted onto the titanium oxide particle film, by the spin-coating method. Then an annealing treatment is performed at 120° C. for 10 minutes in order to form the second electrochromic layer 143. The second electrochromic layer 143 is constituted of the titanium oxide particle film and the electrochromic compounds (the viologen compounds). Herein, the application liquid has 1.0 wt %.

A liquid, in which aqueous polyester series urethane resins (HW350 DIC CO. LTD.) are dissolved into 2,2,3,3-tetrafluoropropanol liquid solution, is painted onto the second electrochromic layer 14B, by the spin-coating method, in order to form a protection layer. Herein, the liquid has 0.5 wt %.

An inorganic insulating layer which is constituted of $ZnS$—$SiO_2$ (8/2) is deposited onto the protection layer by sputtering. The insulating layer has 140 nm thick. Then an ITO layer, which becomes the third display electrode 13C, is deposited onto the insulating layer by sputtering. The ITO layer is 10 mm long, 20 mm wide and 100 nm thick. Resistance of the ITO layer which constitutes the third display electrode 13C is about 200Ω.

A titanium oxide nanoparticle dispersion liquid (SP210, SHOWA TITANIUM CO. LTD.) is painted onto the third display electrode 13C by the spin-coating method, and then an annealing treatment is performed at 120° C. for 15 minutes in order to form a titanium oxide particle film. An application liquid, in which viologen compounds are dispersed into 2,2,3,3-tetrafluoropropanol liquid solution as shown in chemical formula 4, is painted onto the titanium oxide particle film, by the spin-coating method. Then an annealing treatment is performed at 120° C. for 10 minutes in order to form the third electrochromic layer 14C. The third electrochromic layer 14C is constituted of the titanium oxide particle film and the electrochromic compounds (the viologen compounds). Herein, the application liquid has 0.8 wt %.

A liquid, in which aqueous polyester series urethane resins (HW350 DIC CO. LTD.) are dissolved into 2,2,3,3-tetrafluoropropanol liquid solution, is painted onto the third electrochromic layer 14C, by the spin-coating method, in order to form a protection layer. Herein, the liquid has 0.5 wt %.

Then a stacked body which includes the porous film 15, the first display electrode 13A, the first electrochromic layer 14A, the protection layer, the insulating layer, the second display electrode 133, the second electrochromic layer 14B, the protection layer, the insulating layer, the third display electrode 13C, the third electrochromic layer 14C and the protection layer is peeled off from the glass substrate.

<Formulation of the Opposed Electrode>

A glass substrate which is 30 mm long and 30 mm wide is used as the opposed substrate 12. A transparent conductive thin film which is made from tin oxide is deposited onto the whole surface of the glass substrate in order to form the opposed electrode 12A. A dispersion liquid, in which tin oxide particles (Mitsubishi Materials CO. LTD.) are dispersed into 2,2,3,3-tetrafluoropropanol liquid solution is painted onto the transparent conductive thin film, by the spin-coating method. First particle size of the tin oxide particles is 30 nm. The dispersion liquid has 20 wt %. Then an annealing treatment is performed at 120° C. for 15 minutes in order to form the opposed electrode 12A which has 2 μm thick.

<Formation of the Electrochromic Display Apparatus>

The polyethylene porous film (the porous film 15) which is stacked with the first to third electrochromic layers 14A to 14C or the like is mounted onto the opposed electrode 12A, and then an electrolyte solution in which perchloric acid tetrabutylammonium is dissolved into dimethylsulfoxide by 0.1 M is dropped thereinto. The opposed substrate 12 and the display substrate 11 are connected with each other and sealed by the spacer 17 in order to form the electrochromic display apparatus according to the third embodiment. The spacer 17 has 75 μm thick.

The electrochromic display apparatus according to the third embodiment includes a stacked configuration of the porous film 15, the first display electrode 13A, the first electrochromic layer 14A, the protection layer (first protection layer), the insulating layer (first insulating layer), the second display electrode 13B, the second electrochromic layer 14B, the protection layer (second protection layer), the insulating layer (second insulating layer), the third display electrode 13C, the third electrochromic layer 14C and the protection layer (third protection layer). This configuration is similar to the configuration as shown in FIG. 1. Herein, in FIG. 1, the protection layers and the insulating layers are omitted.

<Resistance Between the Display Electrodes>

Resistances between the first display electrode 13A and the second display electrode 13B, and between the second display electrode 13B and the third display electrode 13C show greater than 100 kΩ. Thus, the resistances that are five hundred times more than the respective sheet resistances of the first display electrode 13A, the second display electrode 13B and the third display electrode 13C are obtained. An enhanced electric insulation between the display electrodes is obtained.

A voltage is applied to the electrochromic display apparatus according to the third embodiment in order to evaluate color displayed therefrom. The voltage of 3.0 V is applied to the electrochromic display apparatus for two seconds. Herein, the first to third display electrodes 13A to 13C are connected to the minus terminal of a power source, and the opposed electrode 12A is connected to the plus terminal of the power source.

In the display state of blue, the voltage is applied between the opposed electrode 12A and the first display electrode 13A, thus the electrochromic display apparatus according to the third embodiment displays blue. In the display state of green, the voltage is applied between the opposed electrode 12A and the second display electrode 13B, thus the electrochromic display apparatus according to the third embodiment displays green. In the display state of magenta, the voltage is applied between the opposed electrode 12A and the third display electrode 13C, thus the electrochromic display apparatus according to the third embodiment displays magenta. In the nondisplay state, the voltage is not applied between the opposed electrode 12A and the first display electrode 13A, between the opposed electrode 12A and the second display electrode 13B and between the opposed electrode 12A and the third display electrode 13C, thus the electrochromic display apparatus according to the third embodiment does not display color, i.e. erases color. In the display states, the electrochromic display apparatus according to the third embodiment displays blue, green and magenta, respectively. The electrochromic display apparatus according to the third embodiment displays blue, green and magenta independently, erases colors and holds the display states stably.

<Fourth Embodiment>

<Formation of the Display Electrode and the Electrochromic Layer>

A glass substrate which is 40 mm long and 40 mm wide is used as the display substrate 11. Polyethylene porous film (SUN MAP LC series, NITTO DENKO CO. LTD.) which is 30 mm long and 30 mm wide is used as the porous film 15. The polyethylene porous film is fixed onto the glass substrate by tapes. Then an ITO layer, which becomes the first display electrode 13A, is deposited onto the polyethylene porous film by sputtering. The ITO layer is 16 mm long, 23 mm wide and 100 nm thick. Resistance of the ITO layer which constitutes the first display electrode 13A is about 200Ω.

A titanium oxide nanoparticle dispersion liquid (SP210, SHOWA TITANIUM CO. LTD.) is painted onto the first display electrode 13A by the spin-coating method, and then an annealing treatment is performed at 120° C. for 15 minutes in order to form a titanium oxide particle film. An application liquid, in which viologen compounds are dispersed into 2,2, 3,3-tetrafluoropropanol liquid solution as shown in chemical formula 2, is painted onto the titanium oxide particle film, by the spin-coating method. Then an annealing treatment is performed at 120° C. for 10 minutes in order to form the first electrochromic layer 14A. The first electrochromic layer 14A is constituted of the titanium oxide particle film and the electrochromic compounds (the viologen compounds). Herein, the application liquid has 1.0 wt %. Then the porous film 15 (first porous film 15A) on which the first display electrode 13A and the first electrochromic layer 14A are stacked is peeled off from the glass substrate.

A glass substrate which is 40 mm long and 40 mm wide is used as the display substrate 11. Polyethylene porous film (SUN MAP LC series, NITTO DENKO CO. LTD.) which is 30 mm long and 30 mm wide is used as the porous film 15. The polyethylene porous film is fixed onto the glass substrate by tapes. Then an ITO layer, which becomes the second display electrode 13B, is deposited onto the polyethylene porous film by sputtering. The ITO layer is 16 mm long, 23 mm wide and 100 nm thick. Resistance of the ITO layer which constitutes the second display electrode 13B is about 200Ω.

A titanium oxide nanoparticle dispersion liquid (SP210, SHOWA TITANIUM CO. LTD.) is painted onto the second display electrode 13B by the spin-coating method, and then an annealing treatment is performed at 120° C. for 15 minutes in order to form a titanium oxide particle film. An application liquid, in which viologen compounds are dispersed into 2,2,3,3-tetrafluoropropanol liquid solution as shown in chemical formula 3, is painted onto the titanium oxide particle film, by spin-coating method. Then an annealing treatment is performed at 120° C. for 10 minutes in order to form the second electrochromic layer 14B. The second electrochromic layer 14B is constituted of the titanium oxide particle film and the electrochromic compounds (the viologen compounds). Herein, the application liquid has 1.0 wt %. Then the porous film 15 on (second porous film 15B) which the second display electrode 13B and the second electrochromic layer 14B are stacked is peeled off from the glass substrate.

A glass substrate which is 40 mm long and 40 mm wide is used as the display substrate 11. A polyethylene porous film (SUN MAP LC series, NITTO DENKO CO. LTD.) which is 30 mm long and 30 mm wide is used as the porous film 15. The polyethylene porous film is fixed onto the glass substrate by tapes. Then an ITO layer, which becomes the third display electrode 13C, is deposited onto the polyethylene porous film by sputtering. The ITO layer is 16 mm long, 23 mm wide and 100 nm thick. Resistance of the ITO layer which constitutes the third display electrode 13C is about 200Ω.

A titanium oxide nanoparticle dispersion liquid (SP210, SHOWA TITANIUM CO. LTD.) is painted onto the third display electrode 13C by the spin-coating method, and then an annealing treatment is performed at 120° C. for 15 minutes in order to form a titanium oxide particle film. An application liquid, in which viologen compounds are dispersed into 2,2,3,3-tetrafluoropropanol liquid solution as shown in chemical formula 4, is painted onto the titanium oxide particle film, by the spin-coating method. Then an annealing treatment is performed at 120° C. for 10 minutes in order to form the third electrochromic layer 14C. The third electrochromic layer 14C is constituted of the titanium oxide particle film and the electrochromic compounds (the viologen compounds). Herein, the application liquid has 1.0 wt %. Then the porous film 15 on (third porous film 15C) which the third display electrode 13C and the third electrochromic layer 14C are stacked is peeled off from the glass substrate.

<Formulation of the Opposed Electrode>

A glass substrate which is 30 mm long and 30 mm wide is used as the opposed substrate 12. A transparent conductive thin film which is made from tin oxide is deposited onto the whole surface of the glass substrate in order to form the opposed electrode 12A. A dispersion liquid, in which tin oxide particles (Mitsubishi Materials CO. LTD.) are dispersed into 2,2,3,3-tetrafluoropropanol liquid solution is painted onto the transparent conductive thin film, by the spin-coating method. A first particle size of the tin oxide particles is 30 nm. The dispersion liquid has 20 wt %. Then an annealing treatment is performed at 120° C. for 15 minutes in order to form the opposed electrode 12A which has 2 μm thick.

<Formation of the Electrochromic Display Apparatus>

The polyethylene porous film 15 (the third porous film 15C) which is stacked with the third electrochromic layer 14C and the third display electrode 13C, the polyethylene porous film 15 (the second porous film 15B) which is stacked with the second electrochromic layer 14B and the second display electrode 13B, and the polyethylene porous film 15 (the first porous film 15A) which is stacked with the first electrochromic layer 14A and the first display electrode 13A, are mounted onto the opposed electrode 12A, and then an electrolyte solution in which perchloric acid tetrabutylammonium is dissolved into dimethylsulfoxide by 0.1 M is dropped thereinto. The opposed substrate 12 and the display substrate 11 are connected with each other and sealed by the spacer 17 in order to form the electrochromic display apparatus according to the fourth embodiment. The spacer 17 has 75 μm thick.

Figure 3A:
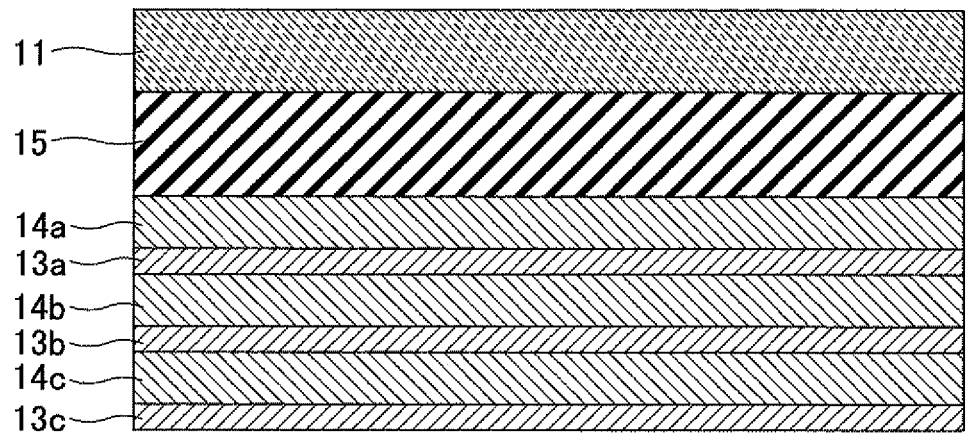
FIGS. 3A to 3H are schematic drawings showing examples of cross-sectional views of electrochromic display apparatuses according to another embodiment.
Figure 3B:
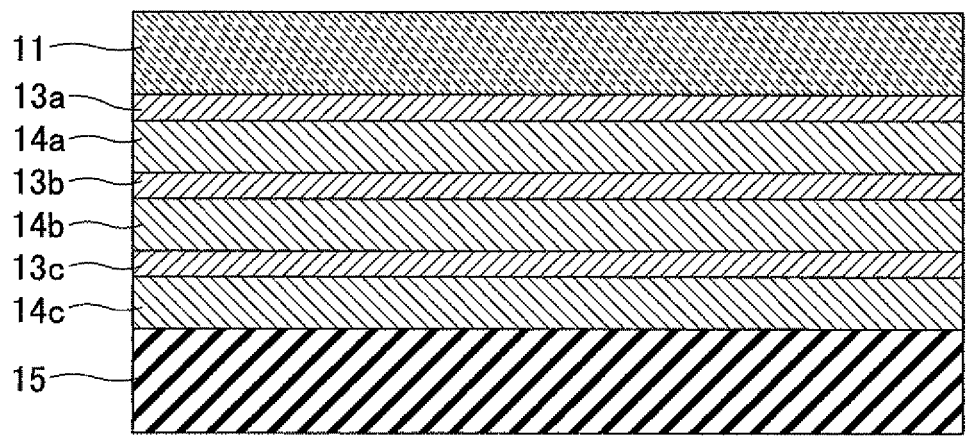
Figure 3C:
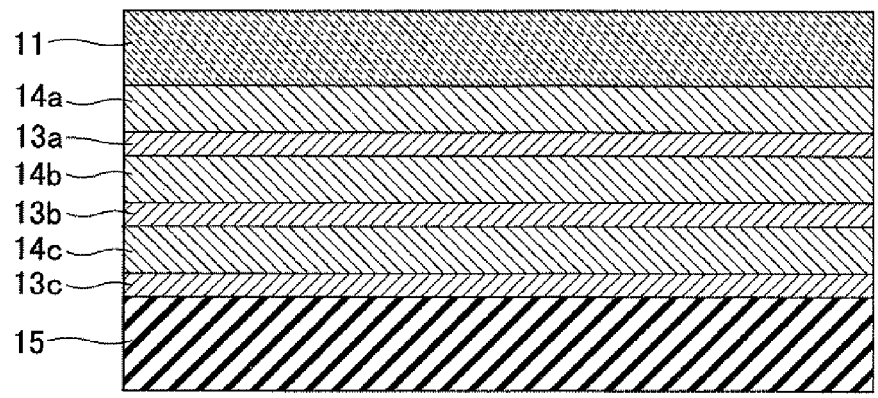
Figure 3D:
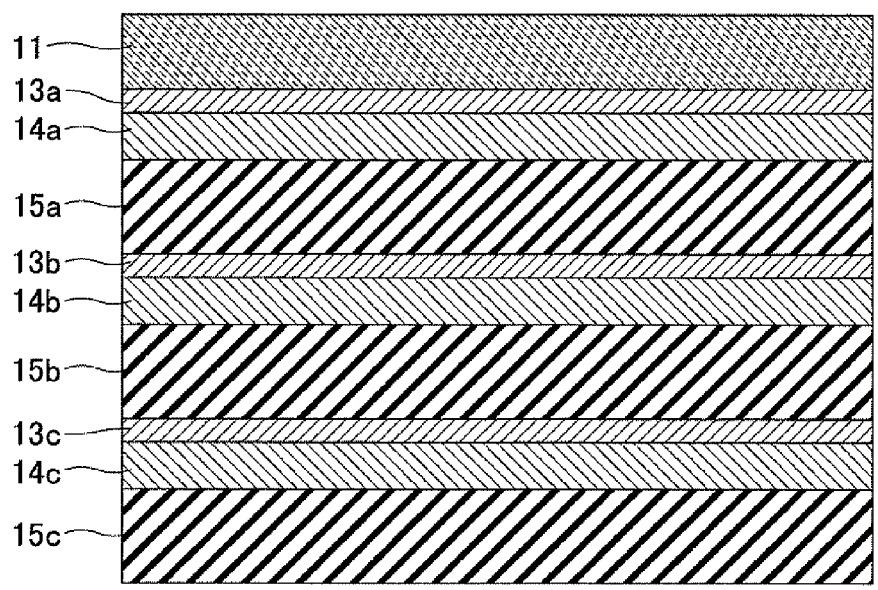
Figure 3E:
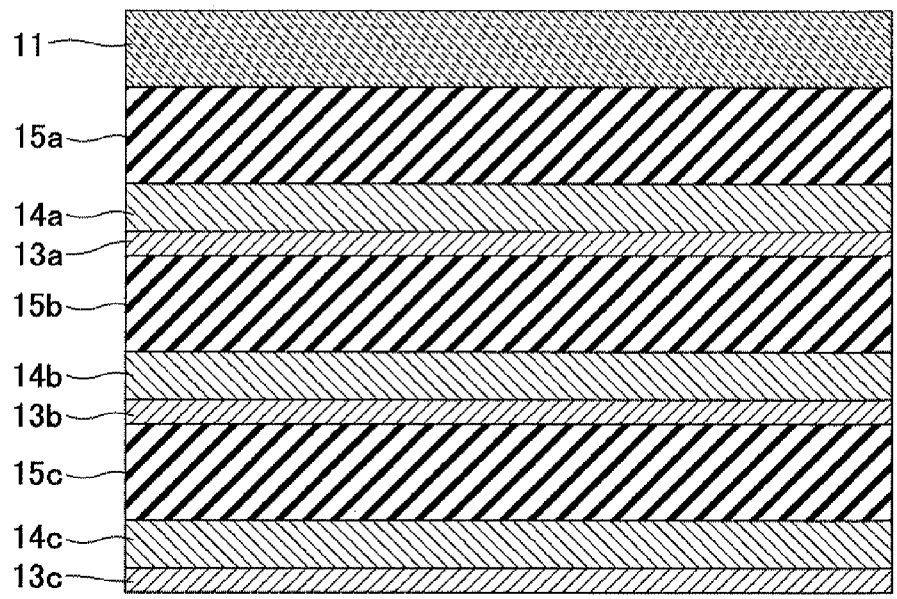
Figure 3F:
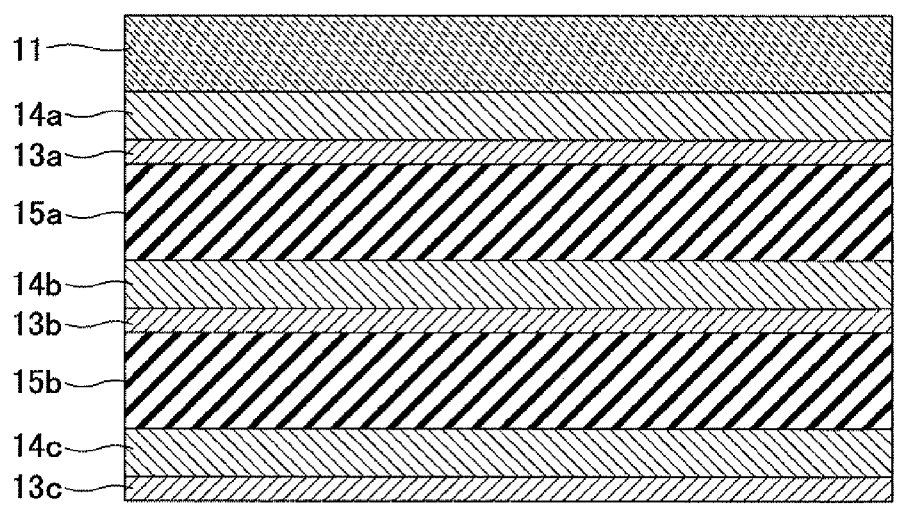
Figure 3G:
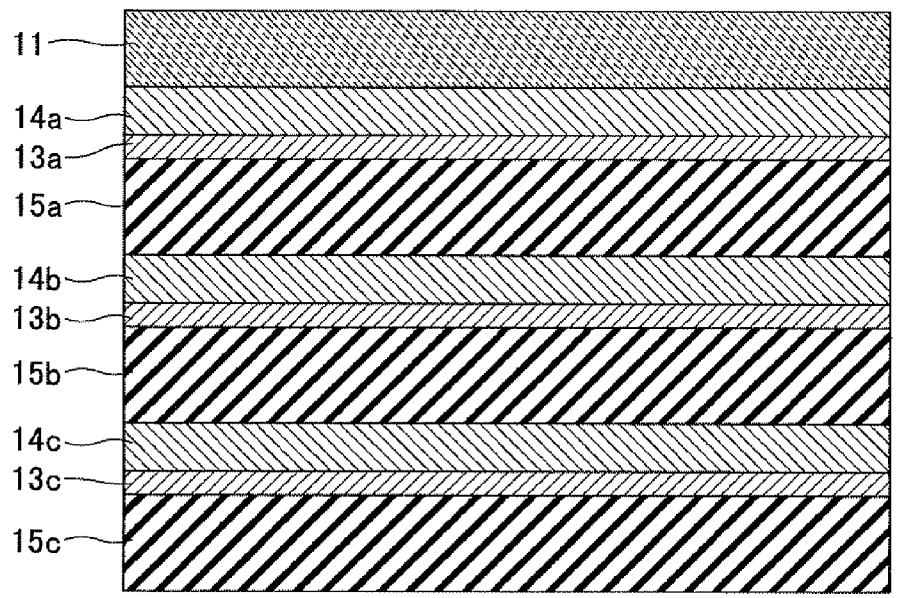
Figure 3H:
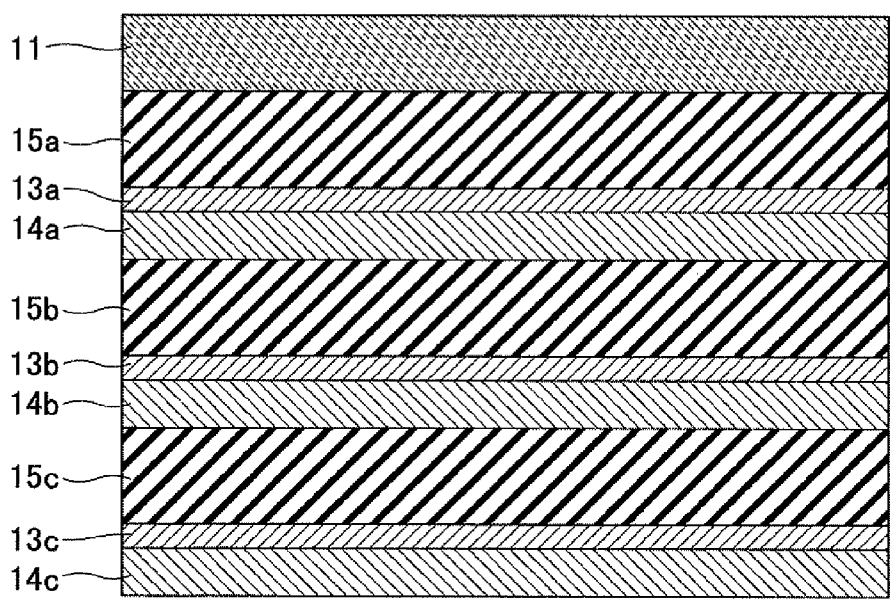

The electrochromic display apparatus according to the fourth embodiment includes a stacked configuration of the first porous film 15A, the first display electrode 13A, the first electrochromic layer 14A, the second porous film 15B, the second display electrode 13B, the second electrochromic layer 14B, the third porous film 15C, the third display electrode 13C and the third electrochromic layer 14C. The configuration of the first display electrode 13A, and the first electrochromic layer 14A is similar to the configuration as shown in FIG. 3H.

<Resistance Between the Display Electrodes>

Resistances between the first display electrode 13A and the second display electrode 13B, and between the second display electrode 13B and the third display electrode 13C show greater than 100 kΩ. Thus, the resistances that are five hundred times more than the respective sheet resistances of the first display electrode 13A, the second display electrode 13B and the third display electrode 13C are obtained. An enhanced electric insulation between the display electrodes is obtained.

A voltage is applied to the electrochromic display apparatus according to the fourth embodiment in order to evaluate color displayed therefrom. The voltage of 3.0 V is applied to the electrochromic display apparatus for two seconds. Herein, the first to third display electrodes 13A to 13C are connected to the minus terminal of a power source, and the opposed electrode 12A is connected to the plus terminal of the power source.

In the display state of blue, the voltage is applied between the opposed electrode 12A and the first display electrode 13A, thus the electrochromic display apparatus according to the fourth embodiment displays blue. In the display state of green, the voltage is applied between the opposed electrode 12A and the second display electrode 13B, thus the electrochromic display apparatus according to the fourth embodiment displays green. In the display state of magenta, the voltage is applied between the opposed electrode 12A and the third display electrode 13C, thus the electrochromic display apparatus according to the fourth embodiment displays magenta. In the nondisplay state, the voltage is not applied between the opposed electrode 12A and the first display electrode 13A, between the opposed electrode 12A and the second display electrode 13B and between the opposed electrode 12A and the third display electrode 13C; thus the electrochromic display apparatus according to the fourth embodiment does not display color, i.e. erases color. In the display states, the electrochromic display apparatus according to the fourth embodiment displays blue, green and magenta, respectively. The electrochromic display apparatus according to the fourth embodiment displays blue, green and magenta independently, erases colors and holds the display states stably.

The present invention is not limited to the specifically disclosed embodiments, and variations and modifications may be made without departing from the scope of the present invention.

The present application is based on Japanese Priority Application No. 2010-056696 filed on Mar. 12, 2010 and Japanese Priority Application No. 2010-265426 filed on Nov. 29, 2010 with the Japanese Patent Office, the entire contents of which are hereby incorporated herein by reference.

What is claimed is:

1. An electrochromic display apparatus comprising:
   a stacked body which includes a display electrode and an electrochromic layer that are stacked with each other;
   a film which includes through holes, and is disposed on one of the display electrode and the electrochromic layer of the stacked body; and
   an opposed substrate on which an opposed electrode that faces toward the display electrode is formed,
   wherein at least a part of materials that constitute the electrochromic layer is included or disposed in the through holes of the film.

2. The electrochromic display apparatus as claimed in claim 1, further comprising:
   an electrolyte that is held by the display electrode and the opposed electrode;
   wherein the film is made of transparent materials that are inactive with the electrolyte.

3. The electrochromic display apparatus as claimed in claim 1, further comprising:
   a second stacked body which includes a second display electrode and a second electrochromic layer that are stacked on each other; and
   a third stacked body which includes a third display electrode and a third electrochromic layer that are stacked on each other;
   wherein the second stacked body and/or the third stacked body are stacked onto one of the stacked body and the opposed electrode.

4. The electrochromic display apparatus as claimed in claim 3, further comprising:
   a second film which includes through holes, and is disposed on one of the second stacked body and the third stacked body.

5. The electrochromic display apparatus as claimed in claim 1, wherein the electrochromic layer includes an electrochromic compound and a metallic oxide which holds the electrochromic compound.

6. The electrochromic display apparatus as claimed in claim 1, further comprising:
   a transparent substrate configured to be disposed on a display surface which is located on a side opposite to that of the opposed substrate.

7. The electrochromic display apparatus as claimed in claim 6, further comprising:
   a transparent seal layer configured to be formed on a surface of the transparent substrate, which surface faces toward the opposed substrate.

* * * * *